United States Patent Office 3,165,506
Patented Jan. 12, 1965

3,165,506
DISAZO DYESTUFFS CONTAINING A TRISUL-
FONATE DIAZO COMPONENT
Raymond Gunst, Binningen, Switzerland, assignor to
Ciba Corporation, a corporation of Delaware
No Drawing. Filed Aug. 8, 1961, Ser. No. 130,006
Claims priority, application Switzerland Aug. 12, 1960
9 Claims. (Cl. 260—153)

The present invention provides valuable, new azo-dyestuffs which are suitable for dyeing fibrous cellulosic materials and correspond to the formula (1) 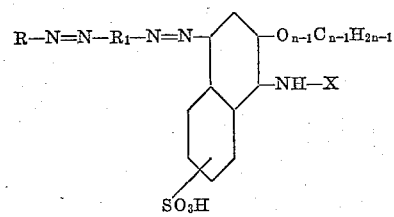

in which R represents a naphthalene radical containing three sulfonic acid groups, $R_1$ represents a benzene or naphthalene radical, X represents a halogenated 1:3:5-triazine radical bound to the —NH— bridge through a ring carbon atom, and $n$ is the whole number 1 or 2.

A suitable radical X is, for example, the dichlorotriazine radical, or a monochlorotriazine radical such as one of the formula

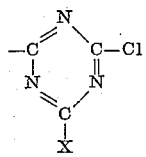

in which Y represents an unsubstituted or substituted amino group or an etherified hydroxyl group or thio group.

The invention also provides a process for the manufacture of the new dyestuffs coresponding to the Formula 1 from an appropriate dyestuff of the formula (2) 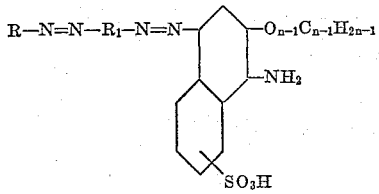

in which R, $R_1$ and $n$ have the meanings given above, by a method in itself known, for example, by condensing the dye-stuff with a dihalogen- or trihalogen-1:3:5-triazine.

As such triazines there may be mentioned, for example, cyanuric bromide and more especially cyanuric chloride, or a primary condensation product of cyanuric chloride containing two chlorine atoms, and in place of the third chlorine atom, a free amino group or an organic radical. Such primary condensation products of 1 molecular proportion of cyanuric chloride with one molecular proportion of a reactive organic mercapto or hydroxyl compound (for example, one molecular proportion of a phenol or an alcohol), one molecular proportion of ammonia or one molecular proportion of an organic amine which may or may not have the character of a dyestuff (for example methyl-, isopropyl-, cyclo-hexyl- or phenylamine, dimethylamine, ethylamine, ethanol-amine, N-methyl-phenylamine, γ-methoxypropylamine, morpholine, aminoethane sulfonic acid, aminoacetic acid, ortho-, meta- or para-aminobenzoic acid, an aminobenzene sulfonic acid such as ortho-, meta- or para-amino-benzene sulfonic acid and 1-aminobenzene-2:5-disulfonic acid, an aminonaphthalene sulfonic acid, for example, 2-amino naphthalene-4:8-disulfonic acid; or a mercapto-compound, such as 2-mercaptobenzthiazole or mercaptoacetic acid) can be made by methods in themselves known. Alternatively, for example, 2:4:6-tribromo- or 2:4:6-trichloro-1:3:5-triazine may advantageously be reacted, on one hand, with a dyestuff of the Formula 2 to form a dihalogen-triazine condensation product and, on the other, with ammonia or with an organic mercapto or hydroxyl compound, or with an organic primary or secondary monamine to form a monohalogen-triazine condensation product.

It is of advantage to carry out the condensations in the presence of an acid-binding agent, such as sodium carbonate or sodium hydroxide, and under conditions, such that one or two exchangeable halogen atoms remain in the final product, that is to say, for example, in an organic solvent, or at a relatively low temperature in an aqueous-organic or aqueous medium.

The acrylatable parent dyestuffs of the Formula 2 can be obtained by coupling 1-aminonaphthalene-8-sulfonic acid, 2-methoxy-1-aminonaphthalene-6-sulfonic acid or above all 1-aminonaphthalene-6-sulfonic acid or 1-aminonaphthalene-7-sulfonic acid with a diazo-compound of the dyestuff of the formula (3) $R-N=N-R_1-NH_2$ The monoazo-dyestuffs of the Formula 3 are obtained by coupling a diazotized 1- or 2-aminonaphthalene trisulfonic acid, such as 1-naphthylamine-2:4:7-, -2:4:8-, -2:5:7-, -3:6:8- or -4:6:8-trisulfonic acid, or 2-naphthylamine-1:3:7-, -1:5:7-, -3:5:7-, -4:6:8- or -3:6:8-trisulfonic acid, with ortho- or meta-toluidine, cresidine, ortho- or meta-anisidine, 3 - acetylamino - 1 - aminobenzene, 3-methanesulfonylamino - 1 - aminobenzene or α-naphthylamine, and especially with a xylidine or with a 1-aminonaphthalene-6-, -7- or -8-monosulfonic acid in an acid medium.

The diazotisation of the aminomonoazo-dyestuffs of the Formula 3 used for making the dyestuffs of the Formula 2 may be carried out by a method in itself known, for example with the use of a mineral acid, more especially hydrochloric acid, and sodium nitrite. The coupling of the resulting diazo-compounds with the aforesaid 1-aminonaphthalene-sulfonic acids capable of coupling in position 4 may also be carried out by a method in itself known.

The dyestuffs formed are advantageously isolated at as low a temperature as possible by salting out and filtration. The filtered dyestuff can be dried, if desired, after having been mixed with an extender and/or buffer, such as a mixture of equal parts of monosodium and disodium phosphate. The drying is advantageously carried out at not too high a temperature and under reduced pressure. In certain cases dry dyestuff preparations can be prepared directly, that is to say, without intermediate isolation of the dyestuffs, by spray-drying the entire mixture in which the dyestuff is made.

The new dyestuffs of the invention are suitable for dyeing and printing a very wide variety of materials such as wool, polyamide and polyurethane fibers, and more especially fibrous cellulosic materials such as linen, regenerated cellulose and above all cotton. They are particularly suitable for dyeing cellulose by the so-called pad-dyeing method in which the material is impregnated with an aqueous solution of the dyestuff which may also contain a salt, and, after the application of an alkali, the dyestuff is fixed on the material in the cold, when a dihalogen-triazine dyestuff is used, or with the aid of heat, when a monohalogeno-triazine dyestuff is used. This method, and also the direct dyeing method which can be used with many of the dyestuffs of the invention, yield valuable dyeings that are fixed fast to washing, and by printing fast prints are obtained.

To improve the wet fastness it is of advantage to subject the dyeings or prints so produced to thorough rinsing in cold and then in hot water, if desired, with the addition of an agent having a dispersing action and promoting the diffusion of any unfixed dyestuff.

Dyeings produced with the new dyestuffs on polyhydroxylated, more especially cellulosic, fibers are in general distinguished by the high stability of the dyestuff-to-fiber bond, by the ease with which any unreacted dyestuff can be washed out, by their good fastness to light, by their good behavior when subjected to an anti-creasing treatment, and especially by their excellent fastness to washing.

The following examples illustrate the invention, the parts and percentages being by weight.

Example 1

To a suspension of 18.6 parts of cyanuric chloride in a mixture of 300 parts of ice and 200 parts of ice water is added a solution, adjusted to pH=7, of 74.9 parts of the amino-diazo-dyestuff (prepared by coupling a diazo-compound of 1-aminonaphthalene-2:5:7-trisulfonic acid with 1-amino-2:5-dimethylbenzene, further diazotization of the resulting amino-monoazo-dyestuff and coupling with 1-aminonaphthalene-6-sulfonic acid) in 500 parts of water. During the condensation the temperature is maintained at about 10 to 15° C. and the pH-value at 4 to 6. After 2 hours the dyestuff is salted out with sodium chloride, filtered off, and washed with sodium chloride solution. The filter cake is mixed with 5 parts of a mixture of equal parts of monosodium phosphate and disodium phosphate as a buffer, and the filter cake is dried in vacuo at 30° C. The dyestuff so obtained dyes cotton from an alkaline bath at 25–35° C. yellow-brown tints which are fast to washing and light.

Example 2

To a suspension of 18.6 parts of cyanuric chloride in a mixture of 300 parts of ice and 200 parts of ice-water is added a solution of 85.1 parts of the amino-disazo-dyestuff (prepared by coupling a diazo-compound from 1-aminonaphthalene-2:5:7-trisulfonic acid with 1-aminonaphthalene-6-sulfonic acid, and diazotization of the resulting amino-monoazo-dyestuff and coupling with 1-amino-naphthalene-6-sulfonic acid) in 500 parts of water. The pH-value is maintained between 5 and 7 at about 10° C. After 2 hours, 300 parts of ammonia are added, the whole is stirred for 4 hours at 40° C., the dyestuff is salted out with sodium chloride, the whole is filtered and the resulting filter cake is dried. The powder so obtained dyes cotton from an alkaline bath red-brown tints which are fast to washing and light.

Example 3

To a suspension of 18.6 parts of cyanuric chloride in a mixture of 300 parts of ice and 200 parts of ice-water is added a solution of 76.5 parts of the amino-disazo-dyestuff (prepared by coupling a diazo-compound of 1-amino-naphthalene-2:5:7-trisulfonic acid with 1-methyl-4-methoxy-3-aminobenzene, and diazotizing the resulting amino-monoazo-dyestuff and coupling with 1-amino-napthalene-6-sulfonic acid) in 500 parts of water. During the condensation the temperature is maintained at about 10° C. and the pH-value between 5 and 7. After 2 hours, 300 parts of a 2 N-solution of ammonia are added, the whole is stirred for 4 hours at 40° C., the dyestuff is precipitated, filtered off and dried. The resulting dyestuff dyes cotton from an alkaline bath red-brown tints which are fast to washing and light.

A dyestuff having very similar properties is obtained by using, instead of 1 - aminonaphthalene - 2:5:7 - trisulfonic acid, 1 - aminonaphthalene - 4:6:8 - trisulfonic acid, and the use of 2-aminonaphthalene-4:6:8-trisulfonic acid yields a dyestuff which dyes cotton somewhat more yellowish brown tints.

Example 4

To a suspension of 18.6 parts of cyanuric chloride in a mixture of 300 parts of ice and 200 parts of ice-water is added a solution, adjusted to pH 7, of 74.9 parts of the amino-disazo-dyestuff (prepared by coupling a diazo-compound of 1-aminonaphthalene-2:5:7-trisulfonic acid with 1 - amino-2:5-dimethylbenzene, and diazotizing the resulting amino-monoazo-dyestuff and coupling with 1-aminonaphthalene - 6 - sulfonic acid) in 500 parts of water. During the condensation the temperature is maintained at about 10 to 15° C. and the pH value at 4 to 6. After 2 hours, 300 parts of a 2 N-solution of ammonia are added, the mixture is stirred for 4 hours at 40° C., stirred until it is cold, the dyestuff is salted out with sodium chloride, filtered off and dried. The resulting dyestuff dyes cotton from an alkaline bath yellow-brown tints that are fast to washing and light.

A similar dyestuff is obtained by using instead of the amino-disazo-dyestuff used above, the disazo-dyestuff obtained by coupling 1-amino-3-methylbenzene with diazotized 1-aminonaphthalene-2:5:7-trisulfonic acid, diazotizing the resulting amino-monoazo-dyestuff and coupling with 1-aminonaphthalene-7-sulfonic acid.

By carrying out the process described in Examples 2 to 4 with cyanuric chloride, the compounds mentioned in column II of the following table, and the disazo-dyestuffs mentioned in column I, there are obtained similar dyestuffs that produce on cellulose the tints given in column III.

| I | II | III |
|---|---|---|
| HO$_3$S—[naphthalene with SO$_3$H]—N=N—[naphthalene]—N=N—[benzene with NH$_2$ and SO$_3$H] (SO$_3$H) | Ammonia | Violet-brown |

| I | II | III |
|---|---|---|
| 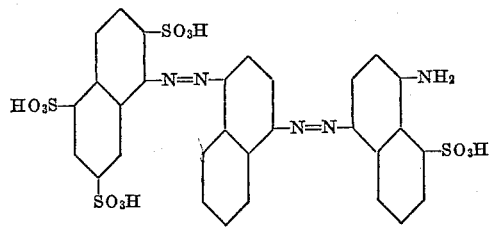 | Aniline | Violet-brown. |
| 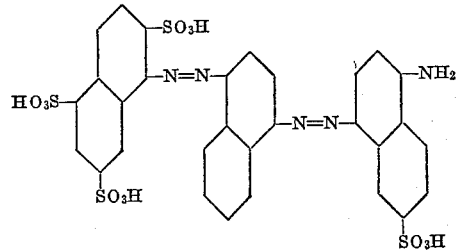 | p-Methoxypropylamine | Do. |
| 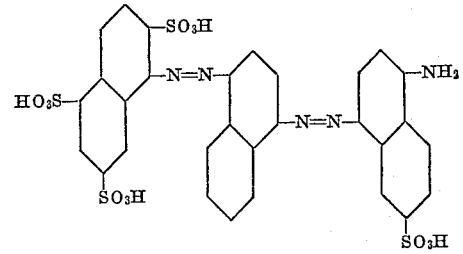 | Ammonia | Red-brown. |
| 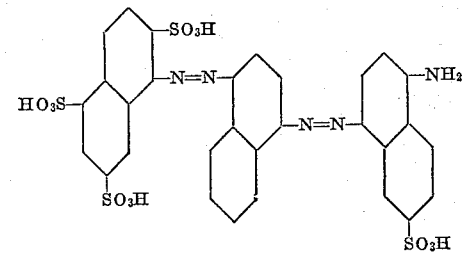 | N-methylaniline | Do. |
| 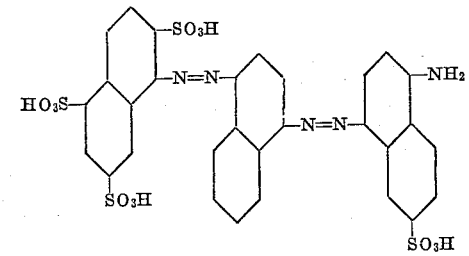 | Ethanolamine | Do. |
| 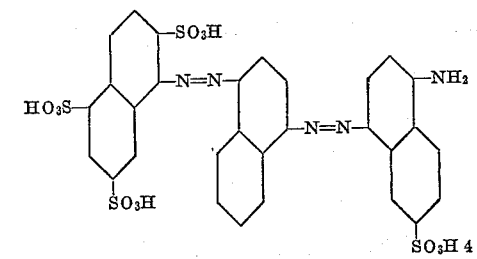 | Diethanolamine | Do. |

| I | II | III |
|---|---|---|
| (structure) | 2-aminobenzoic acid | Red-brown. |
| (structure) | Phenol | Do. |
| (structure) | N-methylaniline sulfonic acid | Do. |
| (structure) | 1-amino-4(4'-aminophenylamino)-anthraquinone-2:3'-disulfonic acid. | Olive-brown. |
| (structure) | 1-amino-7-phenylazo-8-hydroxy-naphthalene-2',3,6-trisulfonic acid. | Dense scarlet. |
| (structure) | Ammonia | Orange-brown. |

| I | II | III |
|---|---|---|
| (structure with naphthalene-SO₃H groups, N=N bridges, CH₃ groups, and NH₂) | Piperidine | Orange-brown. |
| (structure with naphthalene-SO₃H groups, N=N bridges, CH₃ groups, and NH₂) | Morpholine | Do. |

Example 5

A cotton fabric is impregnated on a padding machine with a solution of 2 parts of the dyestuff prepared as described in Example 2 in 100 parts of water at 60 to 80° C. The excess liquor is then removed by squeezing until the fabric retains 75% of its weight of dyestuff solution.

The fabric so impregnated is dried and then impregnated at room temperature with a solution containing, per liter, 10 parts of sodium hydroxide and 300 parts of sodium chloride, squeezed to a weight increase of 75%, steamed for 60 seconds at 100 to 101° C., rinsed, treated in a sodium bicarbonate solution of 0.5% strength, rinsed, soaped for 15 minutes in a boiling solution of 0.3% strength of a non-ionic detergent and dried. The resulting red-brown dyeing is fast to washing and light.

Example 6

2 parts of the dyestuff prepared as described in Example 2 are dissolved, by boiling for a short time in 100 parts of water. The resulting stock solution is added to 2900 parts of water at 20° C. 30 parts of trisodium phosphate and 60 parts of sodium chloride are added. 100 parts of cotton are entered into the resulting dyebath, the temperature is raised to 80° C. in the course of 45 minutes, another 60 parts of sodium chloride are added, and dyeing is continued for 30 minutes at 90 to 95° C. The dyeing is then rinsed, treated for 15 minutes in a boiling solution containing, per liter, 2 grams of sodium carbonate and 3 grams of soap, rinsed and dried. A strong red-brown tint is obtained.

What is claimed is:

1. A water-soluble disazo dyestuff corresponding to the formula

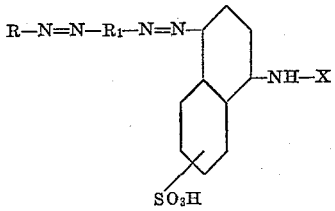

in which R represents a naphthalene radical containing three sulfonic acid groups as sole substituents, $R_1$ represents a member selected from the group consisting of the unsubstituted, the lower alkylated and lower alkoxylated 1:4-phenylene radicals, the 1:4-naphthylene and sulfo-1:4-naphthylene radicals, X represents a 1:3:5-triazine nucleus bound to the —NH— group through one of its carbon atoms, another of its carbon atoms bearing a member selected from the group consisting of a bromine and a chlorine atom and the third of its carbon atoms bearing a member selected from the group consisting of the amino and phenoxy groups.

2. A water-soluble disazo dyestuff corresponding to the formula

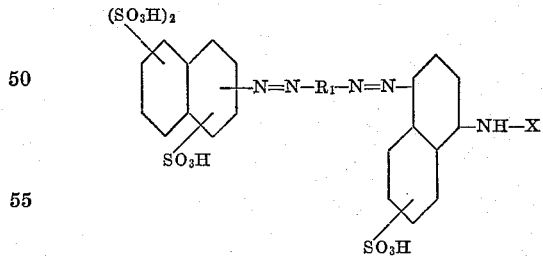

wherein $R_1$ is a benzene radical bound to the —N=N— bridges in 1 and 4 positions and X is a 2-amino-4-chloro-1:3:5-triazine radical.

3. A water-soluble disazo dyestuff corresponding to the formula

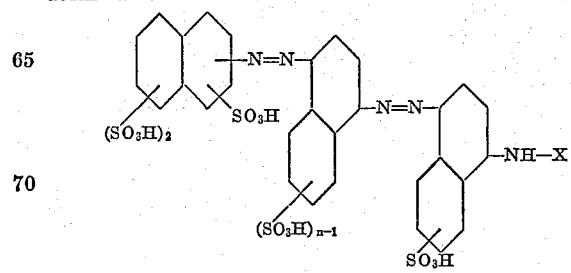

wherein $n$ is a whole positive number up to 2 and X a monohalogenated 1:3:5-triazine radical.

4. A water-soluble diasazo dyestuff corresponding to the formula

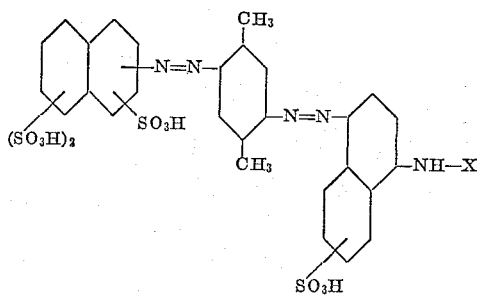

wherein X is a 2-amino-4-chloro-1:3:5-triazine radical bound to the —NH— group in 6-position.

5. A water-soluble disazo dyestuff corresponding to the formula

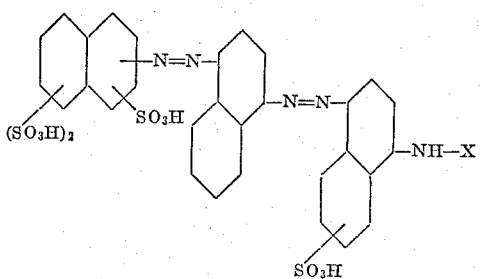

wherein X is a 2-amino-4-chloro-1:3:5-triazine radical bound to the —NH— group in 6-position.

6. The water-soluble disazo dyestuff of the formula

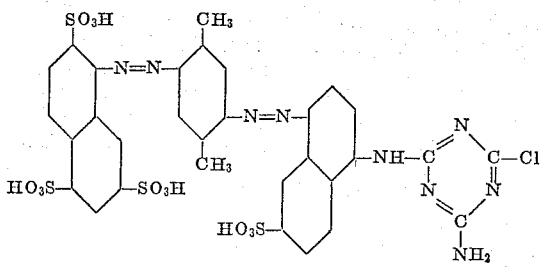

7. The water-soluble disazo dyestuff of the formula

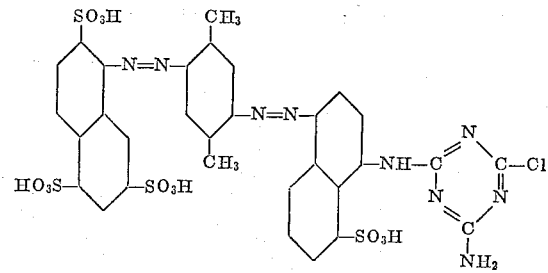

8. The water-soluble disazo dyestuff of the formula

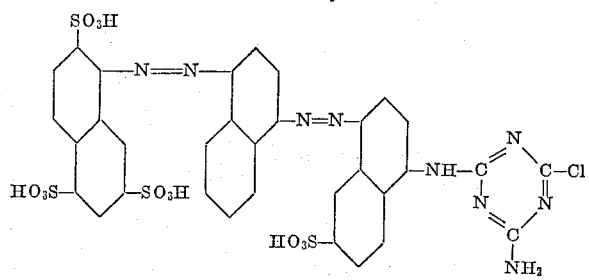

9. The water-soluble disazo dyestuff of the formula

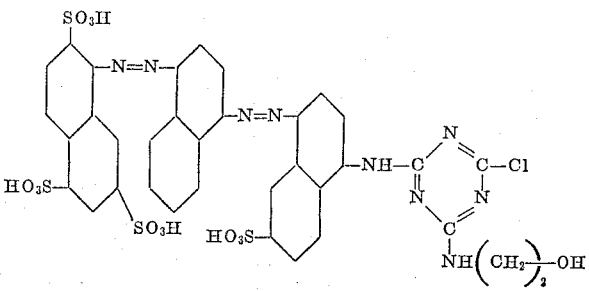

References Cited in the file of this patent

UNITED STATES PATENTS

| | | |
|---|---|---|
| 2,945,022 | Fasciati et al. | July 12, 1960 |
| 3,050,515 | Gunst | Aug. 21, 1962 |

FOREIGN PATENTS

| | | |
|---|---|---|
| 1,246,743 | France | Oct. 17, 1960 |
| 249,545 | Switzerland | May 1, 1948 |